Figure 1:
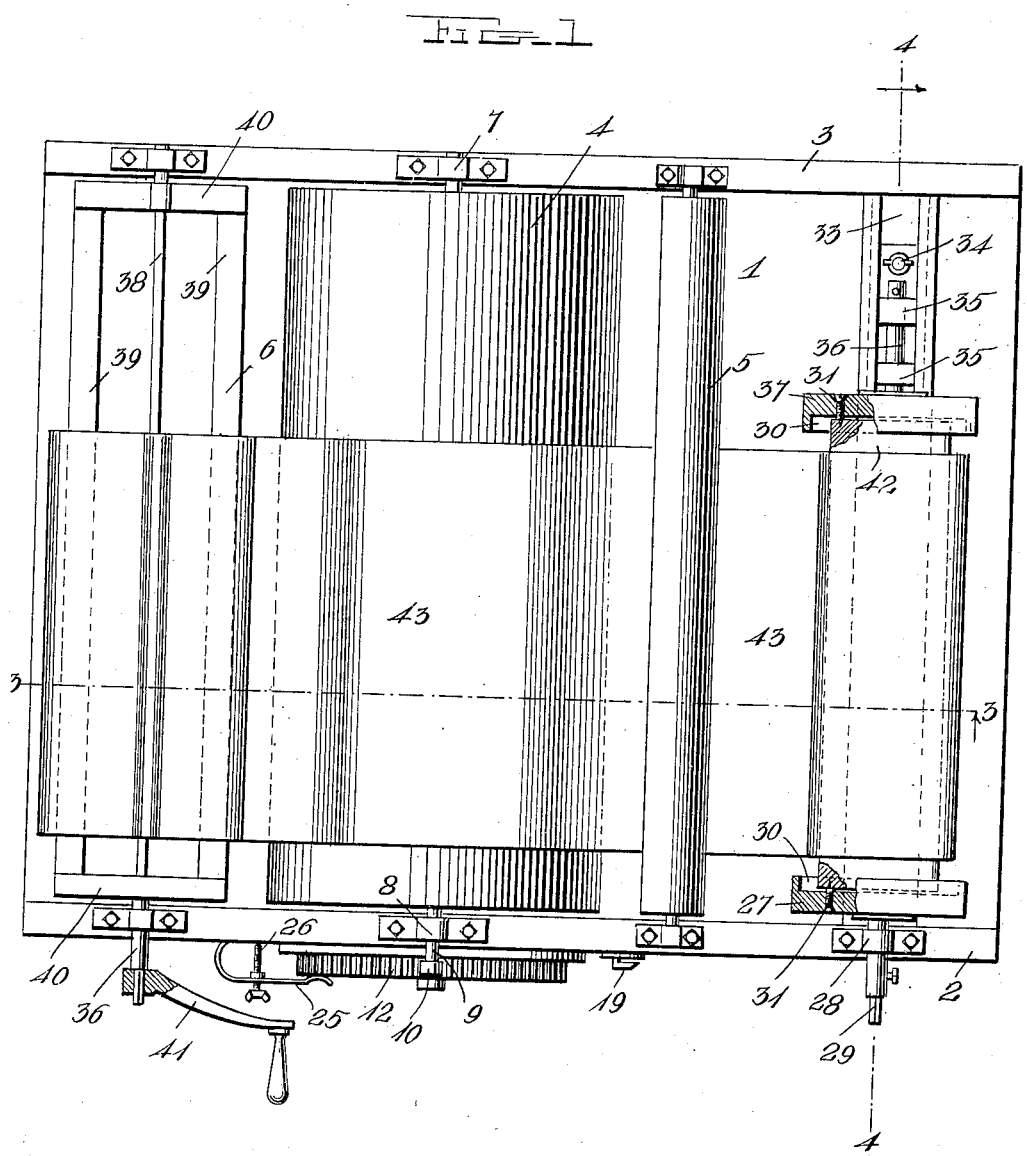

No. 891,075. PATENTED JUNE 16, 1908.
A. C. JACKSON.
CLOTH MEASURING MACHINE.
APPLICATION FILED NOV. 25, 1907.

3 SHEETS—SHEET 1.

Witnesses
C. H. Griesbauer.

Inventor
Asa C. Jackson
By H. B. Willson & Co.
Attorneys

No. 891,075. PATENTED JUNE 16, 1908.
A. C. JACKSON.
CLOTH MEASURING MACHINE.
APPLICATION FILED NOV. 25, 1907.
3 SHEETS—SHEET 2.
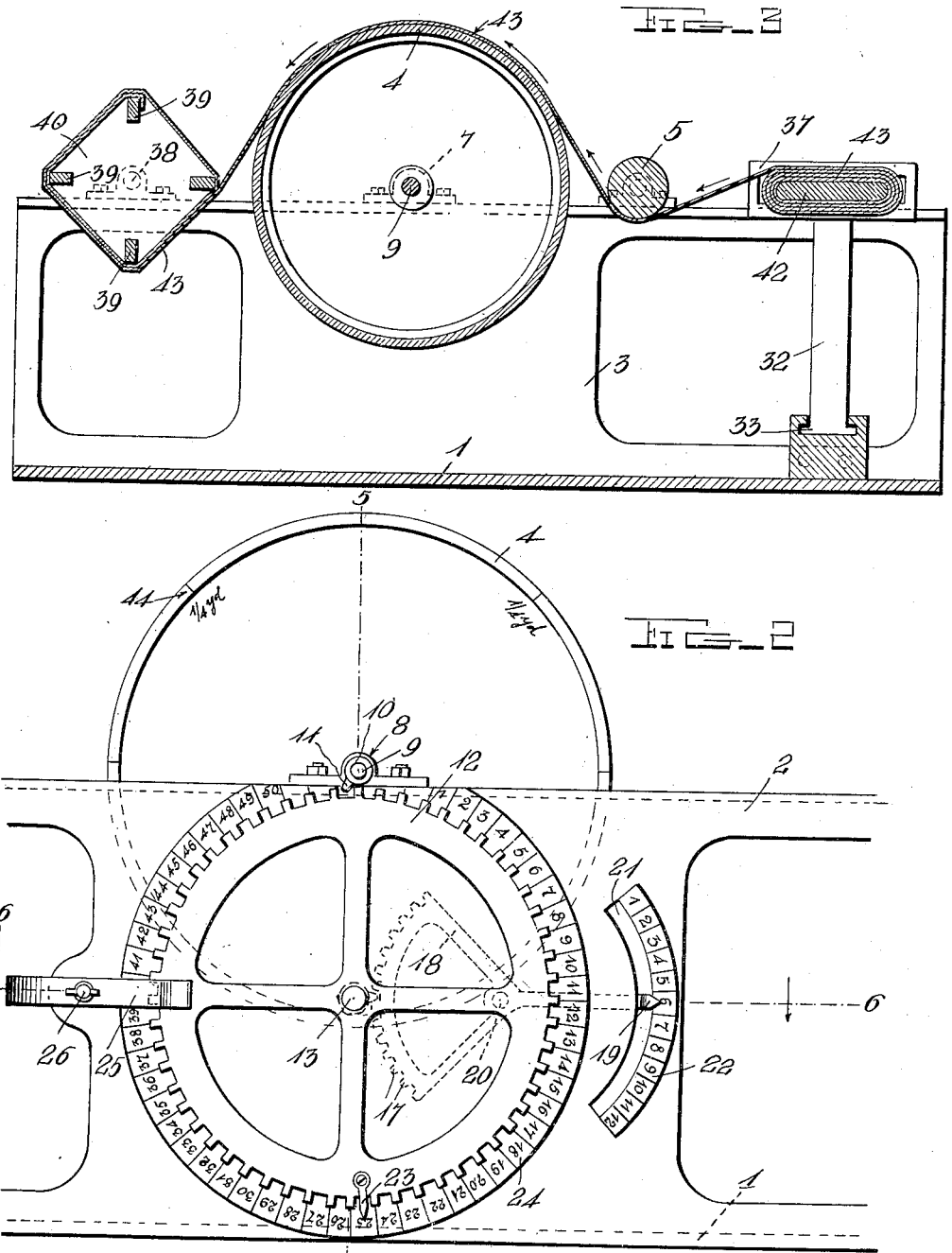

No. 891,075. PATENTED JUNE 16, 1908.
A. C. JACKSON.
CLOTH MEASURING MACHINE.
APPLICATION FILED NOV. 25, 1907.
3 SHEETS—SHEET 3.
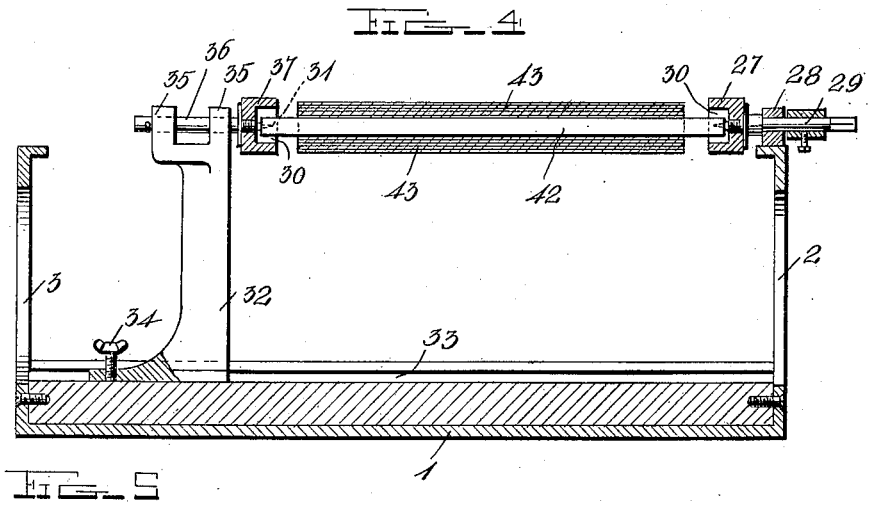
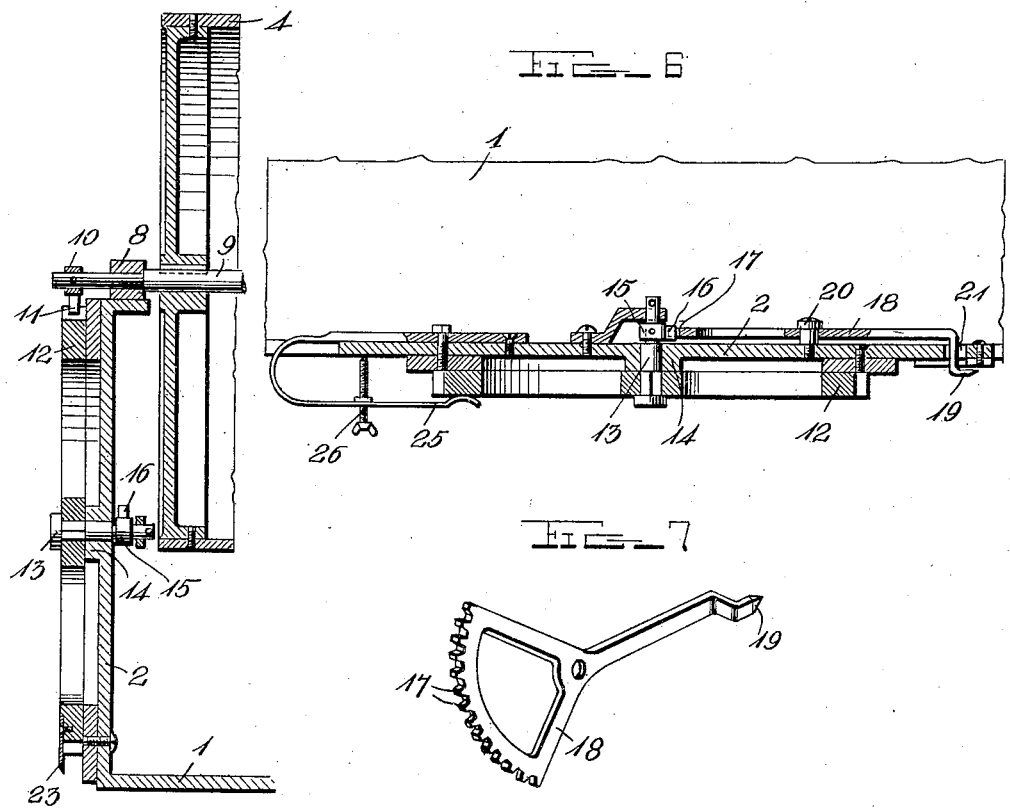
Witnesses
Inventor
Asa C. Jackson
By H. B. Willson & Co.
Attorneys

UNITED STATES PATENT OFFICE.

ASA C. JACKSON, OF NEW MARKET, IOWA.

CLOTH-MEASURING MACHINE.

No. 891,075.

Specification of Letters Patent.

Patented June 16, 1908.

Application filed November 25, 1907. Serial No. 403,775.

*To all whom it may concern:*

Be it known that I, ASA C. JACKSON, a citizen of the United States, residing at New Market, in the county of Taylor and State of Iowa, have invented certain new and useful Improvements in Cloth-Measuring Machines; and I do declare the following to be a full, clear, and exact description of the invention, such as will enable others skilled in the art to which it appertains to make and use the same.

This invention relates to cloth measuring machines, and has for its object to provide a machine of this character which will be accurate and efficient in action, and which may be easily and economically manufactured.

In the accompanying drawings, forming a part of this specification, and in which like reference characters refer to similar parts throughout the several views,—Figure 1 is a top plan view of my machine; Fig. 2 is a side elevation of the central part thereof; Fig. 3 is a section taken on the line 3—3 of Fig. 1; Fig. 4 is a transverse sectional view taken on the line 4—4 of Fig. 1; Fig. 5 is a vertical sectional view taken on the line 5—5 of Fig. 2; Fig. 6 is a horizontal sectional view taken on the line 6—6 of Fig. 2; and Fig. 7 is a detail perspective view of the segmental gear.

As shown in the drawings, in which the proportions shown are merely illustrative and not drawn to any particular scale, my machine comprises a foundation 1, having side pieces 2 and 3, on which side pieces are mounted for rotation the measuring drum 4, the roller 5, and the cloth-receiving rack 6. The side pieces 2 and 3 are provided with bearing boxes 7 and 8 adapted to receive the shaft 9 of the drum 4. One end of said shaft 9 is provided with a collar 10, from which projects laterally a lug 11, adapted to engage a toothed gear 12, rotatably mounted on the stub shaft 13. Said stub shaft 13 passes through a bearing 14 in said side piece 2 and has mounted non-rotatably on its inner end a collar 15, provided with a lug 16, adapted to engage the teeth 17 of the segmental gear 18, provided with a pointer 19. This segmental gear is pivotally mounted on the inner side of said side piece 2 as at 20, the pointer being curved to pass through the slot 21, as shown. A scale 22 is provided upon which said pointer may move. The toothed gear 12 is provided with a pointer 23, adapted to move over the scale 24. A tension device 25, ad- justed by the thumb-screw 26, bears upon the outer face of the toothed gear 12.

At the end of the frame 1, opposite the end on which is mounted the cloth-receiving rack 6, is mounted for rotation the bolt holding rack 27, in the journal box 28 on the shaft 29. This bolt rack 27 is provided with a slot 30, in which may be received the end of the board on which the bolt of cloth is wound. Sharpened screws 31 may be provided projecting into said groove to hold said board in position. Opposed to said bolt holding rack of the frame is provided a support 32, slidable in an undercut groove 33, arranged transversely across the frame. Said support is provided with a thumbscrew 34 by which the same may be held in adjusted position. On the upper end of said support is formed bearings 35 in which is rotatably supported a shaft 36, carrying a bolt holding rack 37, similar to and for coöperation with the bolt holding rack 27. The rack 37 is also provided with a slot 30 and screws 31. The cloth receiving rack 6 is mounted on the shaft 38 and consists of strips 39, held in place by cross arms 40, mounted on the shaft 38. The shafts 38 and 29 are provided with squared ends adapted to receive a crank handle 41.

The operation of my invention is as follows: The bolt of cloth to be measured has inserted through it a board 42. The ends of this board are placed in the grooves 30, the support 32 being adjusted until the screws 31 firmly engage the board 42. The toothed gear 12 is then turned until the pointer 23 indicates zero, the pointer 19 being moved in a like position. The cloth 43 is then passed under the roller 5 and over the drum 3 and is fastened to one of the strips 39 of the rack 6. The tension 25 is properly adjusted. The crank 41 is then caused to rotate the rack 6 and wind thereon the cloth 43, the frictional engagement between the cloth and the drum 4 causing the drum to move so that its circumference will accurately measure the cloth passing thereover. The drum may be designed to be exactly a yard or two yards in circumference, the drawing showing the same one yard in circumference. However, any circumference desirable may be used, and if desired, the quarter yards marked thereon, as shown at 44.

As the drum 4 passes through a complete rotation, the lug 11 engages one of the teeth of the gear 12 and moves the pointer one graduation on the scale 24, the number of graduations indicated by the pointer 23 showing how many times the drum 4 has rotated.

The toothed gear 12 in passing through one complete rotation causes the lug 16 to engage one of the teeth 17 of the segmental gear 18, and thereby move the pointer 19 through one graduation marked on the scale 22. The graduation indicated by the pointer 19 shows the number of complete rotations through which the gear 12 has passed. After all of the cloth has been wound onto the rack 6 and measured, the number of the graduations indicated by the pointers 23 and 19 are noted, then the handle 41 is placed on the squared end of the shaft 29 and the cloth rewound upon the board 42. The support 32 may then be moved to allow the bolt of cloth to be removed, in which case the machine is ready to measure another bolt.

It is thought that the operation of my device will be understood without further explanation.

While herein I have described minute details of my machine, I reserve the right to make such changes in the arrangements and details of construction as fall properly within the scope of my invention, as for instance, the relative arrangements of the roller, the drum and the rack may be changed, and for the support may be substituted rollers on which a round bolt of material, as for instance, carpet, may be placed.

Having described my invention, what I claim as new and desire to secure by Letters-Patent is:

1. In a cloth measuring machine, a rotating drum, means to pass and receive the cloth to and from said drum, means to indicate the number of rotations of said drum, said means comprising a collar adapted to rotate in unison with said drum, a lug on said collar, a toothed gear, the teeth of which are adapted to be engaged by said lug, a pointer rigidly connected to said toothed gear, a stationary scale for said pointer, a second lug adapted to rotate with said toothed gear, a segmental toothed gear the teeth of which are adapted to receive said second named lug, a pointer rigidly secured to said segmental gear, and a stationary scale for said pointer.

2. In combination a foundation, a pair of side pieces thereon, a drum between said side pieces, a shaft rotatably mounted on said side pieces and rigidly secured to and supporting said drum, said shaft having a portion projecting beyond the side piece on which it is mounted, a lug projecting beyond said portion, a stubshaft rotatably mounted in a bearing bore in said last named side piece, a gear wheel on the outside of said last named side piece rigidly secured to rotate with said stub shaft and adapted to be engaged by said lug, a pointer rigidly secured to said gear wheel, a stationary scale for said pointer, a rigidly secured lug projecting from said stub shaft on the inside of said side piece, a segmental gear pivotally mounted to the inner side of said last named side piece and adapted to be engaged by said last named lug, a pointer rigidly secured to said segmental gear and a scale for said pointer on the outside of said last named side piece being provided with a slot through which said last named pointer is adapted to pass and lie adjacent said last named scale.

In testimony whereof I have hereunto set my hand in presence of two subscribing witnesses.

ASA C. JACKSON.

Witnesses:
W. B. ARBUCKLE,
S. H. COLEMAN.